US011580228B2

(12) United States Patent
Antoniadis et al.

(10) Patent No.: US 11,580,228 B2
(45) Date of Patent: Feb. 14, 2023

(54) COVERAGE OF WEB APPLICATION ANALYSIS

(71) Applicant: Oracle International Corporation, Redwood Shores, CA (US)

(72) Inventors: Anastasios Antoniadis, Athens (GR); Raghavendra Ramesh, Brisbane (AU); Padmanabhan Krishnan, Brisbane (AU); Nicholas John Allen, Westlake (AU)

(73) Assignee: Oracle International Corporation, Redwood Shores, CA (US)

( * ) Notice: Subject to any disclaimer, the term of this patent is extended or adjusted under 35 U.S.C. 154(b) by 516 days.

(21) Appl. No.: 16/692,769

(22) Filed: Nov. 22, 2019

(65) Prior Publication Data
US 2021/0157924 A1 May 27, 2021

(51) Int. Cl.
*G06F 21/57* (2013.01)
*G06F 11/36* (2006.01)
*G06F 8/75* (2018.01)

(52) U.S. Cl.
CPC .............. *G06F 21/577* (2013.01); *G06F 8/75* (2013.01); *G06F 11/3604* (2013.01); *G06F 11/3688* (2013.01); *G06F 2221/033* (2013.01)

(58) Field of Classification Search
CPC .... G06F 8/75; G06F 11/3604; G06F 11/3688; G06F 21/577; G06F 2221/033
See application file for complete search history.

(56) References Cited

U.S. PATENT DOCUMENTS

| | | | | |
|---|---|---|---|---|
| 7,181,382 B2* | 2/2007 | Shier | .................. | G06F 11/2273 |
| | | | | 702/182 |
| 8,024,711 B2* | 9/2011 | Albahari | ............. | G06F 11/3604 |
| | | | | 717/130 |
| 8,229,726 B1* | 7/2012 | Magdon-Lsmail | ..... | G06F 30/33 |
| | | | | 703/22 |
| 8,793,656 B2* | 7/2014 | Huang | ................ | G06F 11/3688 |
| | | | | 717/124 |
| 9,009,539 B1* | 4/2015 | Kompotis | ........... | G06F 11/0721 |
| | | | | 714/38.1 |
| 9,183,119 B2* | 11/2015 | Li | ........................ | G06F 11/3664 |
| 10,152,552 B2* | 12/2018 | Simpson | .................. | G06F 8/38 |

(Continued)

OTHER PUBLICATIONS

Grech, Neville et al., "Heaps Don't Lie: Countering Unsoundness with Heap Snapshots"; Cornell University: <https://arxiv.org/pdf/1905.02088.pdf>; Submitted May 6, 2019 (27 pages).

(Continued)

*Primary Examiner* — Douglas M Slachta
(74) *Attorney, Agent, or Firm* — FBFK PC

(57) ABSTRACT

A method for detecting a defect may include extracting, from application code and using a framework support specification corresponding to a framework, a framework interaction between the application code and the framework. The framework interaction specifies an object used by the application code and managed by the framework. The method may further include performing, using the framework interaction, a dynamic analysis of the application code to obtain a heap snapshot, performing, using the heap snapshot and the framework interaction, a static analysis of the application code, and detecting, by the static analysis, the defect.

20 Claims, 6 Drawing Sheets

(56) References Cited

U.S. PATENT DOCUMENTS

| | | | | |
|---|---|---|---|---|
| 2011/0145800 A1* | 6/2011 | Rao | ................ | G06F 11/3636 |
| | | | | 717/133 |
| 2013/0067298 A1* | 3/2013 | Li | .................. | G06F 11/3664 |
| | | | | 714/799 |
| 2015/0234667 A1* | 8/2015 | Malcolm | ............ | G06F 8/443 |
| | | | | 717/166 |
| 2016/0182553 A1* | 6/2016 | Tripp | ............... | G06F 21/577 |
| | | | | 726/25 |
| 2016/0246701 A1* | 8/2016 | Revanna | ........ | G06F 11/3636 |
| 2018/0081791 A1* | 3/2018 | Alabes | ........... | G06F 11/3692 |
| 2018/0349602 A1* | 12/2018 | Johns | ............... | G06F 21/552 |
| 2021/0149788 A1* | 5/2021 | Downie | .......... | G06F 11/366 |

OTHER PUBLICATIONS

Grech, Neville et al., "Shooting from the Heap: Ultra-Scalable Static Analysis with Heap Snapshots"; ISSTA 2018 Proceedings of the 27th ACM SIGSOFT International Symposium on Software Testing and Analysis; pp. 198-208; Jul. 16-21, 2018 (11 pages).

Madsen, Magnus et al., "Safe and Sound Program Analysis with Flix"; ISSTA 2018: Proceedings of the 27th ACM SIGSOFT International Symposium on Software Testing and Analysis; pp. 38-48; Jul. 16-21, 2018 (11 pages).

Sridharan, Manu et al., "F4F: Taint Analysis of Framework-based Web Applications"; <https://manu.sridharan.net/files/oopsla11-f4f-preprint.pdf>; Aug. 18, 2011 (15 pages).

Toman, John et al., "CONCERTO: A Framework for Combined Concrete and Abstract Interpretation"; Proceedings of the ACM on Programming Languages; vol. 3; Issue POPL; Article No. 43; Jan. 2019 (50 pages).

* cited by examiner

COVERAGE OF WEB APPLICATION ANALYSIS

BACKGROUND

Many modern applications use one or more frameworks to facilitate software development. While frameworks provide useful abstractions for commonly used functionality, frameworks typically make extensive use of dynamic language constructs (e.g., reflection) to implement inversion of control. Static analysis techniques used in the detection of defects (e.g., security vulnerabilities, memory leaks, etc.) may be ineffective when applied to framework-based applications that leverage such dynamic language constructs whose behavior only becomes evident at runtime. For example, it is difficult to statically analyze a method call when the method name is based on a string that is manipulated at runtime.

Since frameworks are widely used and well tested, vulnerabilities in the application are generally of more interest than vulnerabilities in frameworks. However, restricting analysis to the application may lead to poor coverage of the application when the application relies on a framework for dependency injection and other framework-provided features.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for detecting a defect including extracting, from application code and using a framework support specification corresponding to a framework, a framework interaction between the application code and the framework. The framework interaction specifies an object used by the application code and managed by the framework. The method further includes performing, using the framework interaction, a dynamic analysis of the application code to obtain a heap snapshot, performing, using the heap snapshot and the framework interaction, a static analysis of the application code, and detecting, by the static analysis, the defect.

In general, in one aspect, one or more embodiments relate to a system for detecting a defect including a computer processor, a repository configured to store application code, a heap snapshot, a framework support specification corresponding to a framework, and a framework interaction between the application code and the framework. The framework interaction specifies an object used by the application code and managed by the framework. The system further includes a code analyzer, executing on the computer processor and configured to extract, from the framework interaction from the application code, perform, using the framework interaction, a dynamic analysis of the application code to obtain a heap snapshot, perform, using the heap snapshot and the framework interaction, a static analysis of the application code, and detect, by the static analysis, the defect.

In general, in one aspect, one or more embodiments relate to a method for detecting a taint flow including extracting, from application code and using a framework support specification corresponding to a framework, a framework interaction between the application code and the framework. The framework interaction specifies an object used by the application code and managed by the framework. The method further includes performing, using the framework interaction, a dynamic analysis of the application code to obtain a heap snapshot, performing, using the heap snapshot and the framework interaction, a static analysis of the application code, and detecting, by the static analysis, the taint flow by determining that a security-sensitive operation accesses the object, and determining that a taint source accesses the object.

Other aspects of the invention will be apparent from the following description and the appended claims.

DETAILED DESCRIPTION

Figure 1:
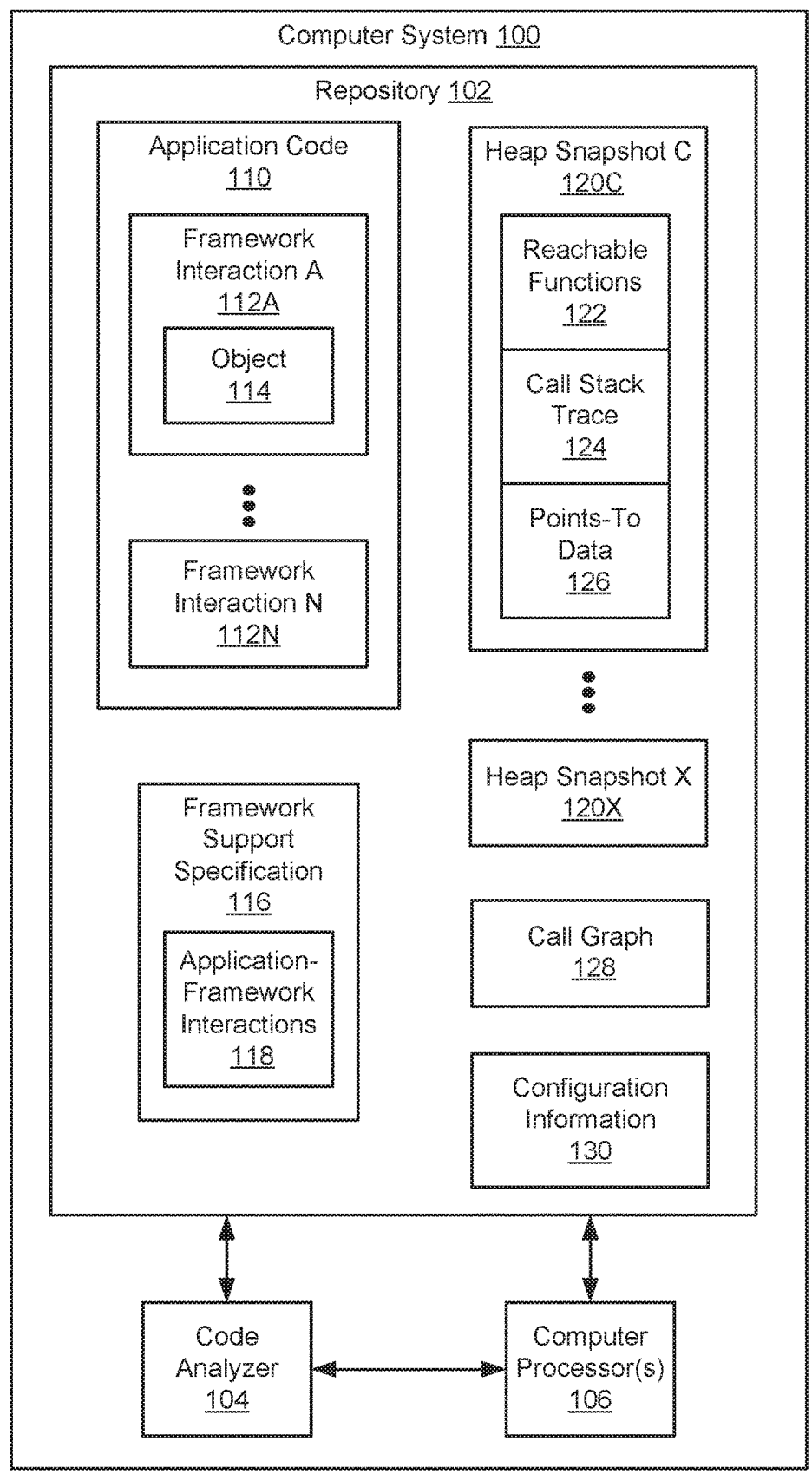
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to improving coverage of an analysis of application code. In one or more embodiments, a framework interaction between the application code and a framework is extracted from the application code using a framework support specification. The framework support specification models the effect of the framework interaction on the application code. The framework interaction may specify an object used by the application code and managed by the framework. For example, the framework support specification may be used to determine whether an object created by an interaction between the application code and the Spring framework refers to a single object instance (e.g., a bean created with singleton scope) or multiple object instances (e.g., a bean created with prototype scope).

A dynamic analysis of the application code may be performed, using the framework interaction, to obtain a heap snapshot. The heap snapshot may include reachable functions, a call stack trace and/or points-to data associated with the framework interaction. The heap snapshot and the framework interaction may be used to increase the coverage of a static analysis of the application code. For example, an edge corresponding to a function call in the call stack trace may be added to a call graph generated for the application code, and a points-to analysis may be seeded with a reachable function identified by the heap snapshot. Progressively more detailed heap snapshots may be used in subsequent dynamic analyses until the static analysis achieves a threshold level of coverage of the application code.

A defect in the application code may be detected by the static analysis. For example, the defect may be a security vulnerability based on a taint flow to an object accessed by a security-sensitive operation in the application code, where a taint source also accesses the object.

FIG. 1 shows a computer system (100) in accordance with one or more embodiments of the invention. As shown in FIG. 1, the computer system (100) includes a repository (102), a code analyzer (104), and one or more computer processors (106). In one or more embodiments, the computer system (100) takes the form of the computing system (500) described with respect to FIG. 5A and the accompanying description below or takes the form of the client device (526) described with respect to FIG. 5B. In one or more embodiments, the computer processor(s) (106) takes the form of the computer processor(s) (502) described with respect to FIG. 5A and the accompanying description below.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes application code (110), a framework support specification (116), heap snapshots (120C, 120X), a call graph (128), and configuration information (130). In one or more embodiments, the application code (110) is a collection of source code including various software components. The application code (110) may include statements written in a programming language, or intermediate representation (e.g., byte code). The application code (110) may be transformed by a compiler into binary machine code. Compiled machine code may be executed by the processor (106) in order to execute software components generated from the application code (110). In one or more embodiments, the application code (110) may be any collection of object code (e.g., machine code generated by a compiler) or another form of the application code (110).

In one or more embodiments, the application code (110) includes framework interactions (112A, 112N). A framework interaction (112A) is an interaction between the application code (110) and a framework. In one or more embodiments, a framework is code that provides generic functionality that may be selectively modified by user-written code. The framework may implement inversion of control, such that the overall flow of control of the application code (110) is dictated by the framework rather than by the application code (110). In one or more embodiments, the user-written code is included in the application code (110). For example, the user-written code may be annotations included within the application code (110). Continuing this example, application code written in Java may include annotations interpreted by the Spring framework. Alternatively, the user-written code may be external to the application code (110). For example, the user-written code may be stored in an XML file.

A framework interaction (112A) may specify an object (114) used by the application code (110) and managed by the framework. For example, the framework may manage the creation of and access to objects (114) used by the application code (110). In one or more embodiments, a framework interaction (112A) specifies a scope of an object (114). The scope may determine how the object (114) is accessed. One example of a framework interaction (112A) is a call to a getBean function (e.g., method) that returns an object (114) (e.g., a bean) managed by the Spring framework. Continuing this example, in the Spring framework, an object (114) defined with a singleton scope corresponds to a single object instance. Thus, each framework interaction (112A) that accesses the object (114) defined with singleton scope accesses the same object instance. In contrast, in the Spring framework, an object (114) defined with a prototype scope may correspond to multiple object instances. For example, a new object instance is created each time the object (114) defined with prototype scope is accessed.

In one or more embodiments, a framework support specification (116) models application-framework interactions (118) corresponding to a specific framework. The framework support specification (116) may include rules that specify the effect of the application-framework interactions (118) on the application code (110). The application-framework interactions (118) may correspond to entry points of the application code (110) where the framework transfers control to the application code (110). The entry points may be used by the code analyzer (104) as starting points for a static analysis that analyzes the application code (110) without executing the application code (110).

As an example, application-framework interactions (118) corresponding to the Spring framework may include rules that model how the Spring framework manages dependency injection and/or other features provided by the Spring framework to the application code (110). Continuing this example, the application-framework interactions (118) may include rules for scoping a bean created by the Spring framework (e.g., the rules may indicate when a bean is created with singleton vs. prototype scope).

In one or more embodiments, configuration information (130) indicates which components of the application code (110) define (e.g., create) objects that are managed by the framework. For example, the configuration information (130) may indicate which components of the application code (110) include framework interactions (112A, 112N). The components of the application code (110) may be classes, methods, functions, interfaces, packages and/or other units within the application code (110). The configuration information (130) may be annotations included within the application code (110). One example of configuration information (130) is the @Configuration annotation in the Spring framework indicating that a class defines one or more @Bean functions (e.g., where the @Bean functions are framework interactions (112A, 112N)). Alternatively, the configuration information (130) may be external to the application code (110). For example, the configuration information (130) may be stored in an XML file.

In one or more embodiments, a heap snapshot (120C) represents information regarding objects (114) used and/or functions called at a point in time during execution of the application code (110). In one or more embodiments, objects (114) are stored in a heap, or an area of memory (e.g., in non-persistent storage (504) of FIG. 5A) used for dynamic (e.g., runtime) memory allocation, such that blocks of memory may be allocated and freed in an arbitrary order. For example, the heap may store objects (114) dynamically allocated by the application code (110).

A heap snapshot (120C) may include reachable functions (122), a call stack trace (124) and/or points-to data (126). In one or more embodiments, a rule indicates which features (e.g., reachable functions (122), call stack trace (124) and/or points-to data (126)) to include in the heap snapshot (120C). A reachable function (122) is a function called during execution of the application code (110). A call stack trace (124) indicates which functions were called by which other functions during execution of the application code (110). The call stack trace (124) may include, for each function call, a block of memory (e.g., in non-persistent storage (504) of FIG. 5A) called an activation record that is allocated on top of a runtime execution stack. The activation record may include values corresponding to the arguments and local variables of the called function. The call stack trace (124) may include activation records for functions that create objects (114).

In one or more embodiments, points-to data (126) includes a variable and an allocation site for an object (114), such that the variable may point to the allocation site during the execution of the application code (110). A variable may be a symbol (e.g., 'x', 'y', 'input', 'result') that references a location in the application code (110) where a value is stored, such as an allocation site. An allocation site may be a statement in the application code (110) that declares, instantiates, and/or initializes an object (114). For example, an allocation site A::x=new T( ) assigns a new object instance of type T to the variable x, where the allocation site is labeled 'A'. In one or more embodiments, the allocation site (e.g., for a base object) may be referred to by the label associated with a 'new' statement. A variable may refer to a simple allocation site (e.g., a numerical or string value), a complex allocation site (e.g., a base object or structure containing one or more fields), or a field within a complex allocation site. The allocation site may contain different values at different points in time.

The points-to data (126) identifies objects (e.g., 114) that have been allocated during the execution of the application code (110). In addition, the points-to data (126) may include "instance field" points-to data that identifies objects referenced by fields in other objects. Furthermore, the points-to data (126) may include "variable" points-to data that identifies objects referenced by arguments and/or variables of functions in the application code (110).

In one or more embodiments, a call graph (128) is a representation of the calling structure of the application code (110). The call graph (128) may include nodes corresponding to functions, where the flow of control between functions is indicated by edges between nodes. For example, an edge (f, g) in the call graph (128) may indicate that a function f calls a function g. In one or more embodiments, the call graph (128) may be part of an intermediate representation of the application code (110) that is compiled into executable machine code. In one or more embodiments, a static analysis (e.g., a security analysis) may be performed on the intermediate representation of the application code (110).

In one or more embodiments, the code analyzer (104) may be implemented in hardware (e.g., circuitry), software, firmware, and/or any combination thereof. The code analyzer (104) may be implemented as part of a compiler. The code analyzer (104) may include functionality to use application-framework interactions (118) and/or configuration information (130) to model the effect of framework interactions (112A, 112N) on the application code (110). The code analyzer (104) may include functionality to generate heap snapshots (120C, 120X) by performing a dynamic analysis of the application code (110). In one or more embodiments, the code analyzer (104) includes functionality to detect defects (e.g., taint flows) in the application code (110) by performing a static analysis of the application code (110).

In one or more embodiments, the computer processor (106) includes functionality to execute the application code (110) and/or the code analyzer (104).

While FIG. 1 shows a configuration of components, other configurations may be used without departing from the scope of the invention. For example, various components may be combined to create a single component. As another example, the functionality performed by a single component may be performed by two or more components.

Figure 2A:
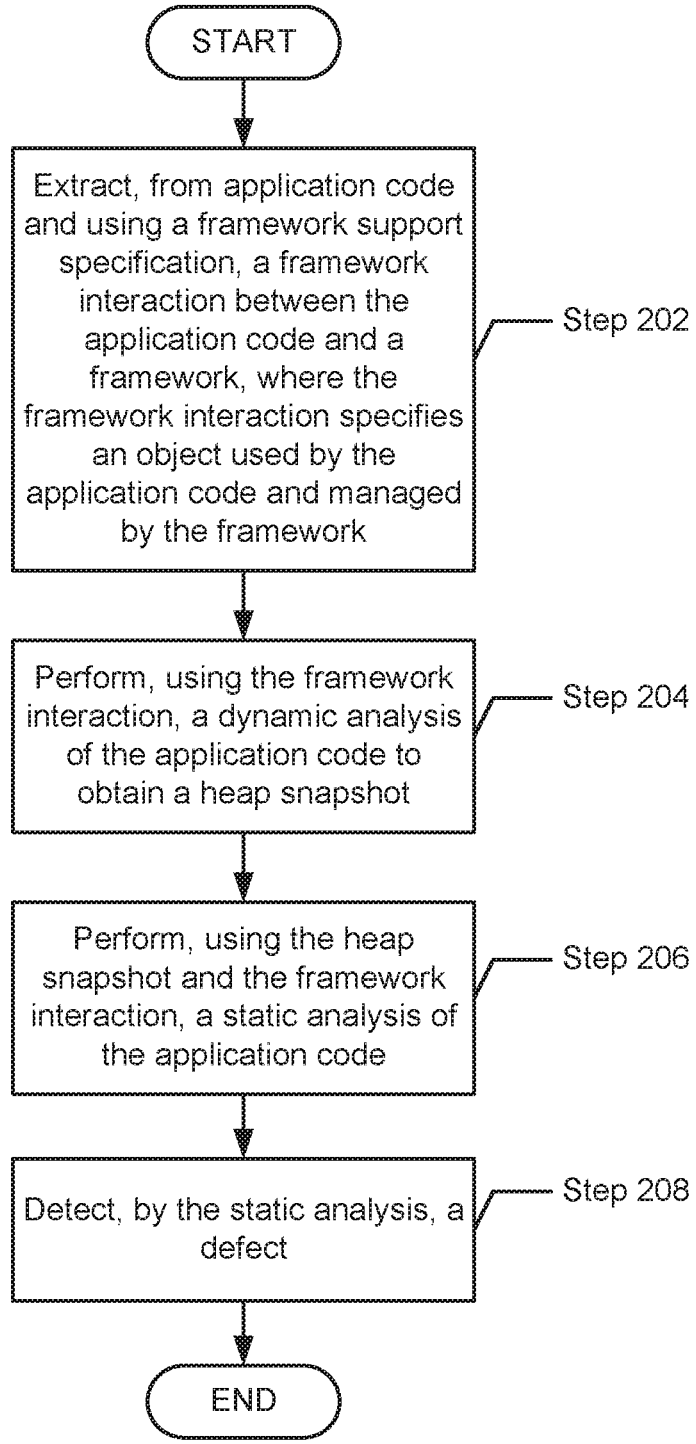
FIG. 2A and FIG. 2B show flowcharts in accordance with one or more embodiments of the invention.

FIG. 2A shows a flowchart in accordance with one or more embodiments of the invention. The flowchart depicts a process for improving coverage of a static analysis. One or more of the steps in FIG. 2A may be performed by the components (e.g., the code analyzer (104) of the computer system (100)), discussed above in reference to FIG. 1. In one or more embodiments of the invention, one or more of the steps shown in FIG. 2A may be omitted, repeated, and/or performed in parallel, or in a different order than the order shown in FIG. 2A. Accordingly, the scope of the invention should not be considered limited to the specific arrangement of steps shown in FIG. 2A.

Initially, in Step 202, a framework interaction between application code and a framework is extracted from the application code using a framework support specification corresponding to the framework. The framework interaction may specify an object used by the application code and managed by the framework. The framework support specification may be obtained from a repository. The code analyzer may use the framework support specification to model (e.g., during a dynamic analysis, as described in Step 204 below and/or a static analysis, as described in Step 206 below) the effect of the framework interaction on the application code. For example, the code analyzer may use the framework support specification to determine whether an object created by an interaction between the application code and the Spring framework refers to a single object instance (e.g., a bean created with singleton scope) or multiple object instances (e.g., a bean created with prototype scope). Continuing this example, the code analyzer may create "mock" objects corresponding to objects created by interactions between the application code and the framework. Still continuing this example, multiple references to a bean created with singleton scope in the Spring framework may refer to the same mock object (e.g., returned as a result of a getBean call), which corresponds to a single object instance.

In one or more embodiments, the code analyzer extracts framework interactions by examining the statements of the application code and identifying annotations (e.g., the @Bean annotation in the Spring framework) known to correspond to a framework interactions. For example, the code analyzer may access a list of annotations that correspond to the creation of an object by a framework. In one or more embodiments, the code analyzer extracts the framework interaction from configuration information (e.g., configuration information stored in an XML file) known to correspond to the creation of an object. As another example, the code analyzer may access a list of annotations used by one or more frameworks that correspond to accessing an object created by a framework. For example, the code analyzer may examine the statements of the application code and extract a request to access an object from an annotation (e.g., the @Autowired annotation in the Spring framework) known to correspond to a request to access an object created by the framework. Alternatively, the code analyzer may extract the access request from procedural code known to correspond to a request to access an object created by the framework. For example, the code analyzer may refer to a list of function calls (e.g., the getBean function call in the Spring framework) that correspond to requests to access objects created by the framework. In one or more embodiments, the code analyzer examines extracts the request to access an object from configuration information (e.g., configuration information stored in an XML file) known to correspond to a request to access an object created by the framework.

In Step 204, a dynamic analysis of the application code is performed, using the framework interaction, to obtain a heap snapshot. The dynamic analysis is performed by executing the application code. For example, the application code may be executed by running one or more tests. The heap snapshot may include reachable functions, a call stack trace and/or points-to data associated with the framework interaction. For example, a rule or configuration setting may determine which features (e.g., reachable functions, call stack trace and/or points-to data) are included in the heap snapshot.

When the heap snapshot includes a call stack trace, the code analyzer may add one or more edges corresponding to function calls in the call stack trace to a call graph generated for the application code. The call graph generated for the application code may be incomplete due to several reasons, and the code analyzer may use the call stack trace to add missing edges to the call graph. For example, a call graph may miss execution paths through the application code in the absence of an accurate model of the dynamic behavior of the application code, which may depend on one or more framework interactions between the application code and a framework. An incomplete call graph may interfere with the identification (e.g., by a static analysis, as described in Step 206 and Step 208 below) of security vulnerabilities and other defects in the application code. The code analyzer may add an edge the call graph corresponding to a function that creates an object specified by the framework interaction and managed by the framework (see description of Step 202 above). In addition, the call graph may be missing edges due to the difficulty in modeling the dynamic behavior of the application code. For example, the application code may be event-driven, where different portions of the application code (e.g., when the application code is a web application) are executed depending on the stream of requests received from users at runtime. Furthermore, the application code may be written in a highly dynamic language, such as JavaScript.

When the heap snapshot includes reachable functions of the application code, the code analyzer may seed a points-to analysis with the reachable functions. The points-to analysis may be incomplete (e.g., due to the reasons listed above), and the code analyzer may increase the breadth of the points-to analysis to include the arguments and/or variables of the reachable functions.

The code analyzer may use a mock object to propagate flows of values while performing the dynamic analysis. For example, the code analyzer may track the usage of the mock object during the execution of the application code. Propagating flows of values to and from a mock object may be useful when generating points-to data corresponding to an object created by an interaction between the application code and the framework.

The code analyzer may generate the heap snapshot when the application code is initialized and executing, in which case the heap snapshot includes any objects that have been "eagerly" created by the framework when the application code is initialized. Alternatively or additionally, the code analyzer may generate the heap snapshot during testing of the application code, in which case the heap snapshot includes any objects that relate to and/or are created as a result of the behavior of the application code exercised by the tests.

As an example, the code analyzer may generate the heap snapshot using tools such as jmapST (a version of jmap with stack traces) that are available with recent versions of Java. Older versions of Java (e.g., prior to Java 9) may provide similar capabilities using the hprof tool. jmapST permits a user to obtain heap snapshots by sampling, which allows the user to control the level of computational resources expended when generating heap snapshots.

In Step 206, a static analysis of the application code is performed using the heap snapshot and the framework interaction. In one or more embodiments, the static analysis uses a call graph generated for the application code. The call graph may include additional edges corresponding to function calls in the call stack trace included in the heap snapshot, as described in Step 204 above. In one or more embodiments, the static analysis uses points-to data generated by a points-to analysis seeded with reachable functions included in the heap snapshot, as described in Step 204 above.

In Step 208, the defect is detected by the static analysis. In one or more embodiments, the static analysis detects the defect using the points-to data generated by the points-to analysis to reason about flows of values among objects and/or variables of the application code. The defect may be a security vulnerability based on a taint flow to an object accessed by a security-sensitive operation in the application code, where a taint source also accesses the object. For example, the taint source may be a function that writes a potentially tainted value into a field of the object (e.g., the object instance) accessed by the security-sensitive operation. In one or more embodiments, the security-sensitive operation accesses a security-sensitive resource of the computer system. The code analyzer may determine that an operation is a security-sensitive operation by consulting a list of known security-sensitive operations. In one or more embodiments, the taint source is a component of the application code that receives potentially tainted data. For example, the taint source may be a function that receives a potentially tainted value from a user or external source. The code analyzer may determine that a function is a taint source by consulting a list of known taint sources.

The code analyzer may generate a report that includes each defect (e.g., taint flow) detected. The report may indicate one or more framework interactions corresponding to the defect. For example, the report may indicate the locations (e.g., line numbers), in the application code, of the framework interactions. The code analyzer may report a taint flow corresponding to each combination of a taint source and a security-sensitive operation that may both access the same object (e.g., the same object instance).

Figure 2B:
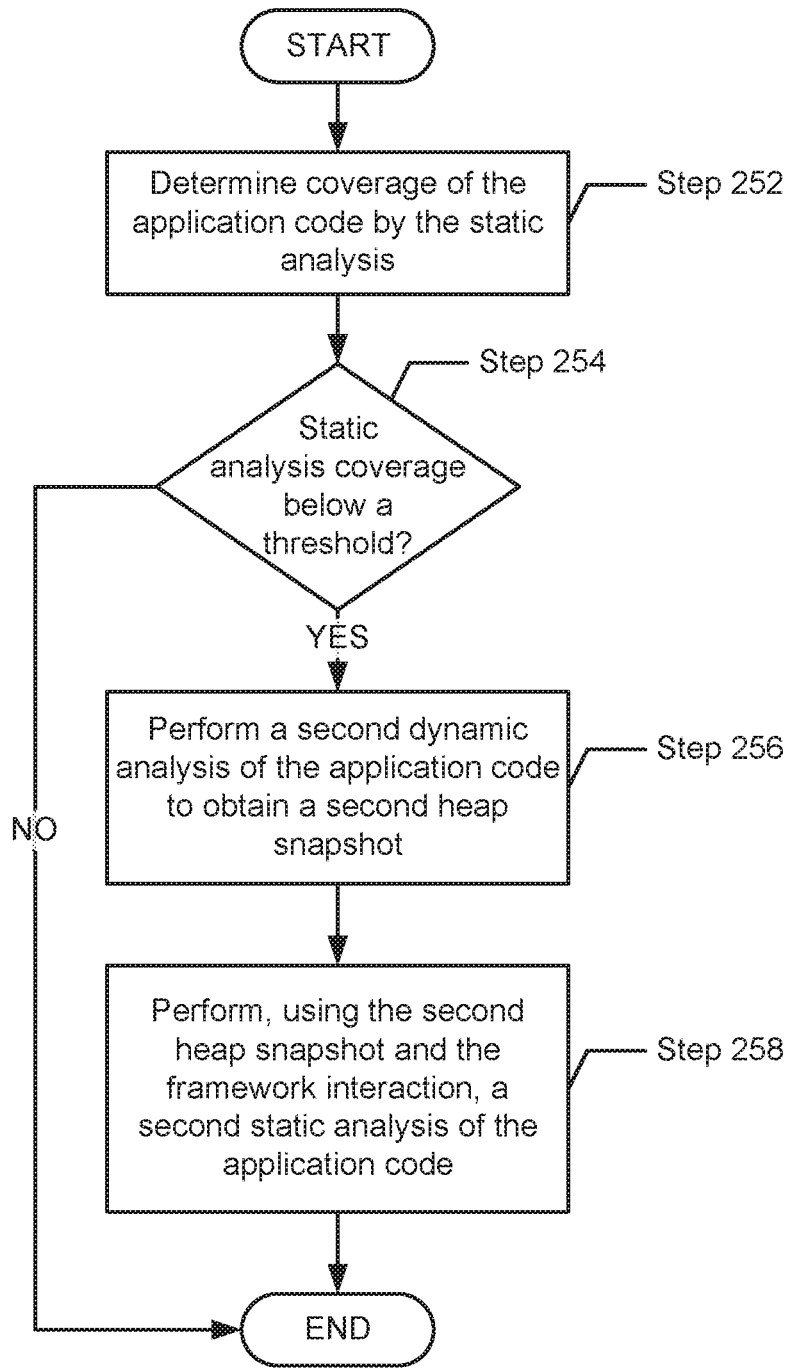

FIG. 2B shows a flowchart in accordance with one or more embodiments of the invention. The flowchart depicts a process for improving coverage of a static analysis. One or more of the steps in FIG. 2B may be performed by the components (e.g., the code analyzer (104) of the computer system (100)), discussed above in reference to FIG. 1. In one or more embodiments of the invention, one or more of the steps shown in FIG. 2B may be omitted, repeated, and/or performed in parallel, or in a different order than the order shown in FIG. 2B. Accordingly, the scope of the invention should not be considered limited to the specific arrangement of steps shown in FIG. 2B.

Initially, in Step 252, coverage of the application code by the static analysis (e.g., the static analysis performed in Step 206 above) is determined. In one or more embodiments, the code analyzer determines the coverage based on the size of the call graph generated for the application code. For example, the code analyzer may calculate the size of the call graph using the number of nodes and/or the number of edges in the call graph. Continuing this example, the call graph may include one or more edges added to the call graph by the code analyzer in Step 204 above. Alternatively, the code analyzer may determine the coverage based on the ratio of the number of functions corresponding to a node in the call graph and the total number of functions in the application code. Still alternatively, the code analyzer may determine the coverage based on the ratio of the number of lines of application code executed (e.g., as a result of performing the dynamic analysis in Step 204 above) and the total number of lines of the application code and/or the ratio of the number of branches in conditional blocks in the application code executed and the total number of branches in conditional blocks in the application code. The code analyzer may use a code coverage tool (e.g., the open source JaCoCo tool) to determine the coverage of the application code.

If, in Step 254, a determination is made that the coverage is below a threshold, then in Step 256 a second dynamic analysis of the application code is performed, using the framework interaction, to obtain a second heap snapshot (see description of Step 204 above). The code analyzer may attempt to increase the coverage of the application code by a second static analysis (e.g., the static analysis performed in Step 258 below) by obtaining a second heap snapshot that is a more detailed heap snapshot relative to a first heap snapshot (e.g., the heap snapshot obtained in Step 204 above). The second heap snapshot may include one or more additional features that were not included in the first heap snapshot. For example, the additional features included in the second heap snapshot may be reachable functions, a call stack trace and/or points-to data.

Alternatively or additionally, the second dynamic analysis may attempt to increase the coverage of the application code by exercising additional portions of the application code. For example, the second dynamic analysis may perform additional tests on the application code that were not performed by the first dynamic analysis.

Alternatively or additionally, the code analyzer may attempt to increase the coverage of the application code by obtaining additional framework support specifications corresponding to one or more frameworks used by the application code. That is, the additional framework support specifications may provide a more detailed model of interactions between the application code and one or more frameworks, which may increase the coverage of the application code. For example, the additional framework support specifications may enable the code analyzer to identify additional points-to data and/or additional reachable functions that may be used to increase the coverage of the application code. Continuing this example, the additional points-to data may enable the identification of flows of values among objects that correspond to additional defects in the application code. In addition, the additional reachable functions may be used to further seed the static analysis, thus increasing the coverage of the application code.

In Step 258, a second static analysis of the application code is performed, using the second heap snapshot and the framework interaction (see description of Step 206 above). The second static analysis may achieve increased coverage of the application code relative to the initial static analysis (e.g., the static analysis performed in Step 206 above). For example, the increased coverage may be due to the additional features added to the detailed heap snapshot obtained in Step 256 above. In one or more embodiments, the code analyzer repeats the process described by FIG. 2B until the coverage achieved of the application code by a static analysis equals or exceeds the threshold of Step 254 above.

Experiments conducted using open source web applications showed that the coverage of the application code achieved by a static analysis increased substantially when either heap snapshots or framework support specifications were provided to the static analysis. When both heap snapshots and framework support specifications were provided to the static analysis, the coverage achieved by the static analysis was increased even further.

Figure 3:
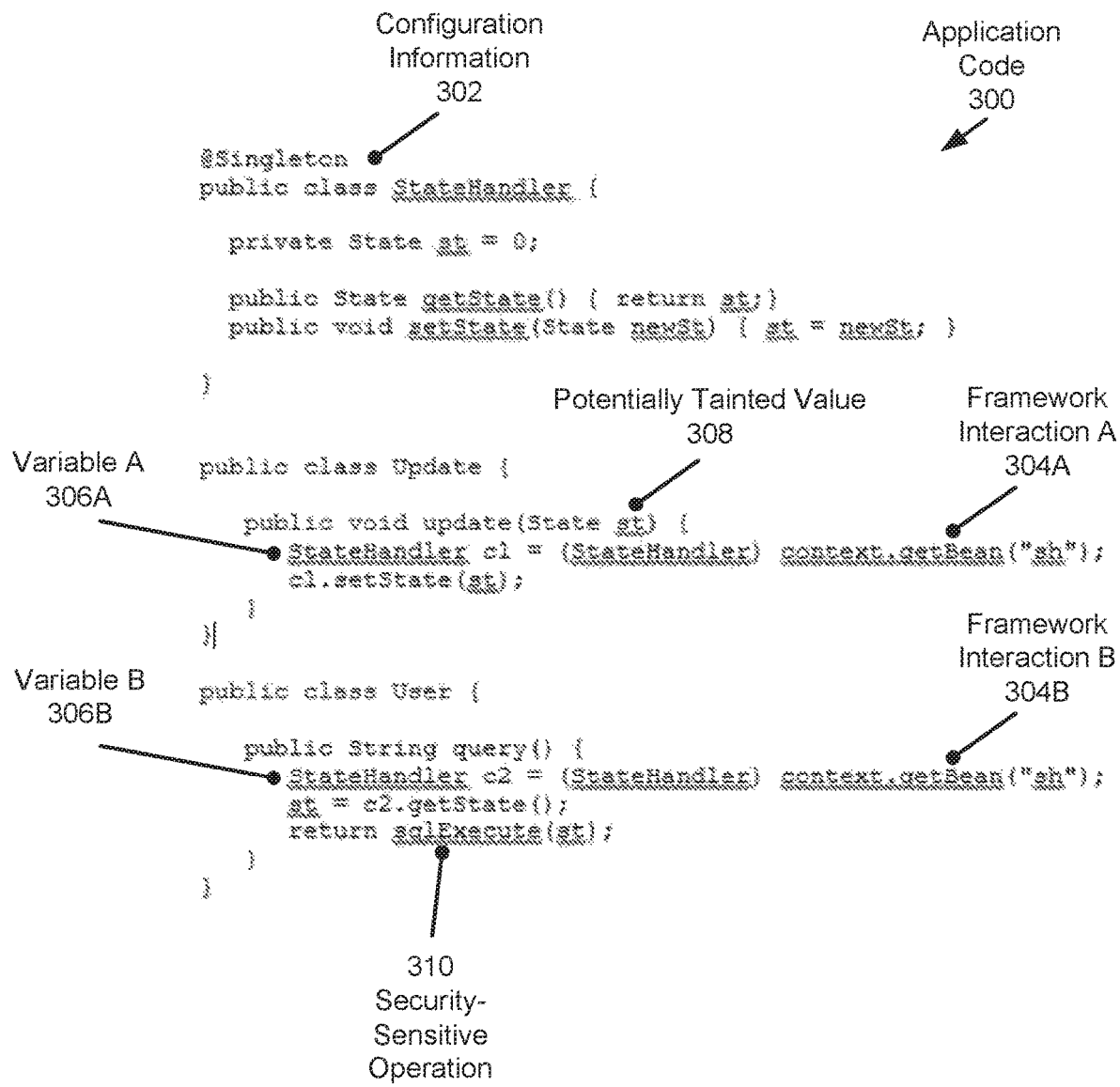
FIG. 3 and FIG. 4 show examples in accordance with one or more embodiments of the invention.
Figure 4:
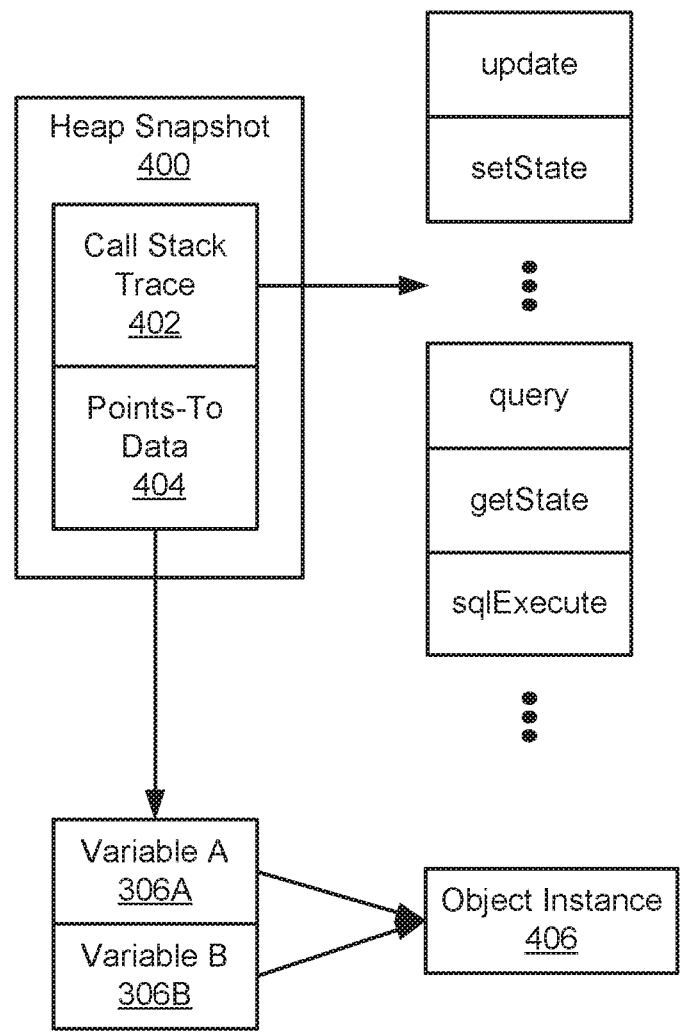

The following examples are for explanatory purposes only and not intended to limit the scope of the invention. FIG. 3 and FIG. 4 show an implementation example in accordance with one or more embodiments of the invention. FIG. 3 shows application code (300) ((110) in FIG. 1) which uses the Spring framework. The application code (300) includes configuration information (302) ((130) in FIG. 1), framework interactions (304A, 304B) ((112A, 112N) in FIG. 1), variables (306A, 306B), a potentially tainted value (308), and a security-sensitive operation (310). The configuration information (302) is the Spring annotation @Singleton indicating that the class StateHandler corresponds to an object (e.g., bean) that is scoped to a single object instance. The code analyzer models, using a framework support specification for the Spring framework, any access to an object created by the class StateHandler as an access to the same instance of the class StateHandler. Thus, the code analyzer models framework interactions (304A, 304B), which are calls to the getBean function of the Spring framework, as accesses the same "singleton" instance of the class StateHandler. Variables c1 and c2 (306A, 306B) are bound to the returned value of the getBean function, and thus variables c1 and c2 (306A, 306B) also access the same instance of the class StateHandler.

The potentially tainted value (308) is received by the update function and assigned to the argument st of the update function. The potentially tainted value (308) may be assigned to the local variable st of the class StateHandler by a call from the update function to the setState function. Thus, the security-sensitive operation sqlExecute (310) is injected with the potentially tainted value (308) if the function update (which calls setState) is called before the function query (which calls getState).

A standard static analysis will not include any objects corresponding to the variables c1 and c2 (306A, 306B) since the static analysis, in the absence of the framework support specification for the Spring framework, will be unable to model the framework interactions (304A, 304B). For example, the standard static analysis will not know that any access to an object created by the class StateHandler is an access to the same instance of the class StateHandler (e.g., due to the singleton scoping of the bean StateHandler). Thus, according to the standard static analysis, the functions setState and getState are not resolvable, and hence are unreachable, and would not be present in a call graph generated for the application code (300).

FIG. 4 shows a heap snapshot (400) ((120C, 120X) in FIG. 1) generated by the code analyzer while performing a dynamic analysis of the application code (300). The heap snapshot (400) includes a call stack trace (402) ((124) in FIG. 1) and points-to data (404) ((126) in FIG. 1). The call stack trace (402) indicates that the functions update, setState, query, getState, and sqlExecute were called during execution of the application code (300). The code analyzer adds edges corresponding to the functions in the call stack trace (402) to a call graph generated for the application code (300). The points-to data (404) indicates that variables c1 and c2 (306A, 306B) refer to the same object instance (406) of the class StateHandler.

There are multiple ways that the code analyzer may use the heap snapshot (400) to increase the coverage (e.g., relative to the standard static analysis) of the application code (300). The call stack trace (402) indicates that the function setState is called before the function getState, and thus the code analyzer determines that the tainted value (308) flows to the object instance (406) from setState to getState, and thus the tainted value (308) is injected into the security-sensitive operation sqlExecute (310). However, even if the call stack trace (402) (e.g., based on executing a specific testing suite for application code (300)) did not indicate that the function setState is called before the function getState, the points-to data (404) indicates that variables c1 and c2 (306A, 306B) refer to the same object instance (406) of the class StateHandler. Thus, combined with the observation that variable c1 (306A) may transmit the tainted value (308) to the object instance (406), the code analyzer may also detect the taint flow based on the points-to data (404).

The heap snapshot (400) is generated after the initialization of the application code (300). In this example, the call to getBean is executed "eagerly" by the container executing the application code (300) when the application code (300) is initialized. Thus, the result (e.g., object instance (406)) returned by the call to getBean is accessible by the heap snapshot (400). In an alternate scenario, the heap snapshot (400) is generated (e.g., sampled) during the testing of the application code (300). For example, when the call to getBean is executed "lazily" (e.g., the call to getBean is not executed during initialization of the application code (300)), the result returned by the call to getBean is accessible by the heap snapshot (400) only when the dynamic analysis of the application code (300) actually executes (e.g., via a test case) the call to getBean.

The code analyzer then performs a static analysis of the application code (300) using the call graph and the points-to data (404). The static analysis identifies the flow of the potentially tainted value (308) from the setState function to the getState function, and then to the security-sensitive operation sqlExecute (310).

Figure 5A:
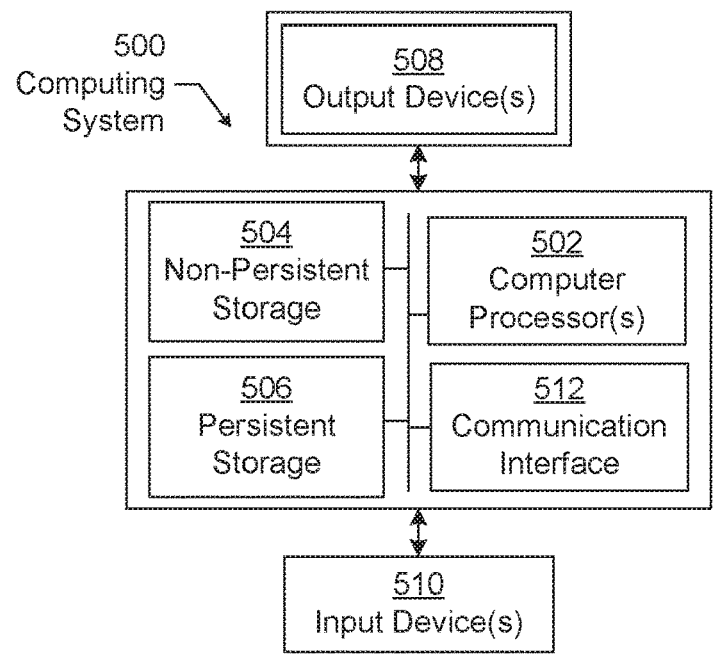
FIG. 5A and FIG. 5B show computing systems in accordance with one or more embodiments of the invention.

Embodiments disclosed herein may be implemented on a computing system specifically designed to achieve an improved technological result. When implemented in a computing system, the features and elements of this disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
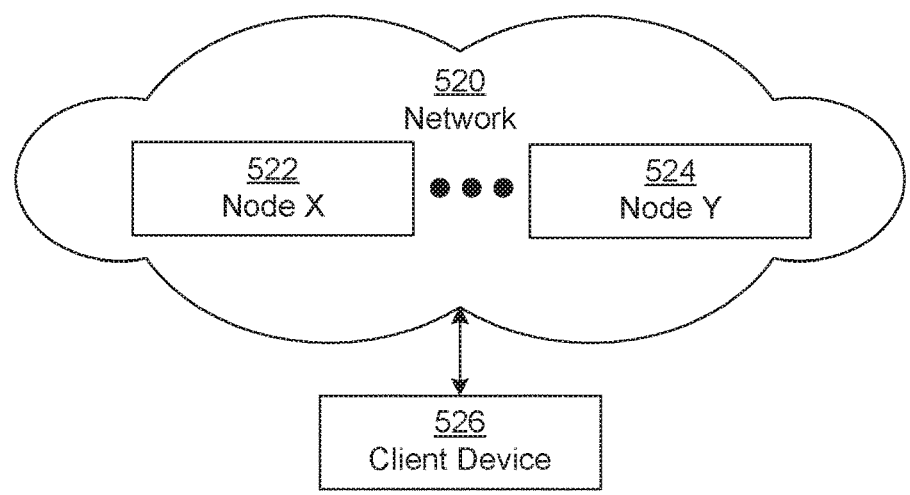

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting a defect, comprising:
   extracting, from application code and using a framework support specification corresponding to a framework, a framework interaction between the application code and the framework,
      wherein the framework interaction specifies an object used by the application code and managed by the framework, and
      wherein the framework is code selectively modifiable by the application code;

executing the application code with the framework using the framework interaction to perform a first dynamic analysis of the application code to obtain a first heap snapshot;

performing, using the first heap snapshot and the framework interaction, a static analysis of the application code, wherein performing the static analysis comprises using a call stack trace in the first heap snapshot to obtain a call graph used in the static analysis; and detecting, by the static analysis, the defect.

2. The method of claim 1, the method further comprising:
adding, using the call stack trace, an edge to the call graph generated for the application code, wherein the edge corresponds to a function that accesses the object.

3. The method of claim 1, wherein the first heap snapshot comprises a reachable function of the application code and points-to data corresponding to the object, the method further comprising:
seeding a points-to analysis with the reachable function, wherein the points-to analysis generates the points-to data.

4. The method of claim 1, further comprising:
determining coverage of the application code by the static analysis;
in response to the coverage being below a threshold, performing, using the framework interaction, a second dynamic analysis of the application code to obtain a second heap snapshot; and
performing, using the second heap snapshot and the framework interaction, a second static analysis of the application code.

5. The method of claim 1, wherein performing the first dynamic analysis comprises:
generating, using the framework support specification and the object, a mock object; and
tracking usage of the mock object during execution of the application code.

6. The method of claim 1, further comprising:
initializing the application code, wherein the first dynamic analysis is performed in response to the initializing.

7. The method of claim 1, further comprising:
testing the application code, wherein the first dynamic analysis is performed during the testing.

8. The method of claim 1, wherein the framework interaction assigns a singleton scope to the object.

9. A system for detecting a defect, comprising:
a computer processor;
a repository configured to store application code, a first heap snapshot, a framework support specification corresponding to a framework, and a framework interaction between the application code and the framework,
wherein the framework interaction specifies an object used by the application code and managed by the framework, and
wherein the framework is code selectively modifiable by the application code; and
a code analyzer executing on the computer processor and configured to:
extract the framework interaction from the application code,
executing the application code with the framework using the framework interaction to perform a first dynamic analysis of the application code to obtain the first heap snapshot,
perform, using the first heap snapshot and the framework interaction, a static analysis of the application code, wherein performing the static analysis comprises using a call stack trace in the first heap snapshot to obtain a call graph used in the static analysis, and
detect, by the static analysis, the defect.

10. The system of claim 9, and wherein the code analyzer is further configured to:
add, using the call stack trace, an edge to the call graph generated for the application code, wherein the edge corresponds to a function that accesses the object.

11. The system of claim 9, wherein the first heap snapshot comprises a reachable function of the application code and points-to data corresponding to the object, and wherein the code analyzer is further configured to:
seed a points-to analysis with the reachable function, wherein the points-to analysis generates the points-to data.

12. The system of claim 9, wherein the code analyzer is further configured to:
determine coverage of the application code by the static analysis,
in response to the coverage being below a threshold coverage, perform, using the framework interaction, a second dynamic analysis of the application code to obtain a second heap snapshot, and
perform, using the second heap snapshot and the framework interaction, a second static analysis of the application code.

13. The system of claim 9, wherein the code analyzer is further configured to perform the first dynamic analysis by:
generating, using the framework support specification and the object, a mock object, and
tracking usage of the mock object during execution of the application code.

14. The system of claim 9, wherein the code analyzer is further configured to:
initialize the application code, wherein the code analyzer performs the first dynamic analysis in response to initializing the application code.

15. The system of claim 9, wherein the code analyzer is further configured to:
testing the application code, wherein the code analyzer performs the first dynamic analysis during the testing.

16. The system of claim 9, wherein the framework interaction assigns a singleton scope to the object.

17. A method for detecting a taint flow, comprising:
extracting, from application code and using a framework support specification corresponding to a framework, a framework interaction between the application code and the framework,
wherein the framework interaction specifies an object used by the application code and managed by the framework, and
wherein the framework is code selectively modifiable by the application code;
executing the application code with the framework using the framework interaction to perform a first dynamic analysis of the application code to obtain a first heap snapshot;
performing, using the heap snapshot and the framework interaction, a static analysis of the application code, wherein performing the static analysis comprises using a call stack trace in the heap snapshot to obtain a call graph used in the static analysis; and
detecting, by the static analysis, the taint flow by:
determining that a security-sensitive operation accesses the object, and
determining that a taint source accesses the object.

18. The method of claim 17, the method further comprising:
adding, using the call stack trace, an edge to the call graph generated for the application code, wherein the edge corresponds to the security-sensitive operation.

19. The method of claim 17, wherein the heap snapshot comprises a reachable function of the application code and points-to data corresponding to the object, the method further comprising:
seeding a points-to analysis with the reachable function, wherein the points-to
analysis generates the points-to data, and wherein the reachable function is the security-sensitive operation.

20. The method of claim 17, further comprising:
generating a report comprising the taint flow, wherein the taint flow comprises a flow from the taint source to the security-sensitive operation.

\* \* \* \* \*

UNITED STATES PATENT AND TRADEMARK OFFICE
CERTIFICATE OF CORRECTION

PATENT NO. : 11,580,228 B2
APPLICATION NO. : 16/692769
DATED : February 14, 2023
INVENTOR(S) : Antoniadis et al.

It is certified that error appears in the above-identified patent and that said Letters Patent is hereby corrected as shown below:

In the Claims

In Column 16, Line 57, delete "a first heap" and insert -- a heap --, therefor.

Signed and Sealed this
Nineteenth Day of December, 2023

Katherine Kelly Vidal
*Director of the United States Patent and Trademark Office*